United States Patent [19]

Meroni

[11] Patent Number: 4,573,299
[45] Date of Patent: Mar. 4, 1986

[54] FLOOR COVERING ARTICLE

[75] Inventor: Rico Meroni, Altendorf, Switzerland

[73] Assignee: Forbo-Teppichwerk AG, Lachen, Switzerland

[21] Appl. No.: 548,292

[22] Filed: Nov. 3, 1983

[30] Foreign Application Priority Data

Nov. 4, 1982 [CH] Switzerland .......................... 6422/82
Dec. 10, 1982 [CH] Switzerland .......................... 6422/82

[51] Int. Cl.$^4$ ............................................. E04C 2/10
[52] U.S. Cl. ..................................... 52/513; 264/257; 428/95; 428/119; 428/159; 428/160; 428/300
[58] Field of Search ...................... 52/126.6, 785, 388, 52/506; 403/326, 332; 428/95, 119, 300, 159, 180, 160; 264/257, 259

[56] References Cited

U.S. PATENT DOCUMENTS

| 1,994,644 | 3/1935 | Harshberger | 52/388 |
| 2,368,611 | 1/1945 | Charnock | 403/326 |
| 3,205,633 | 9/1965 | Nusbaum | 52/785 |
| 3,206,351 | 9/1965 | Smith | 428/119 |
| 3,295,272 | 1/1967 | Kanno | 52/126.6 |
| 4,016,318 | 4/1977 | DiGioia et al. | 428/95 |
| 4,353,947 | 10/1982 | Northcutt | 428/119 |

Primary Examiner—James L. Ridgill, Jr.
Attorney, Agent, or Firm—Toren, McGeady, Stanger, Goldberg & Kiel

[57] ABSTRACT

The platelike floor covering article comprises a number of base elements and a covering material forming the walking surface, which covering material is bonded to the base elements. Each base element is a latticework surrounded by a rim member and has first latticed bars which support together with the rim member the covering material on the floor and comprises second latticed members of reduced height and supporting freely the covering material. The individual base elements are provided with slots for receipt of a ring-shaped interconnecting member which interconnects adjacent base elements. The floor covering article is mounted with help of a ⊥-shaped guiding member which projects into the gaps prevailing between adjacent base elements. The rim element is provided with further slots such that thoroughfares under the covering material are present, through which electrical cables or similar products can be located and kept away from view. The individual platelike floor covering articles can be individually replaced such that an easy replacement of worn or soiled floor covering articles is possible.

18 Claims, 4 Drawing Figures

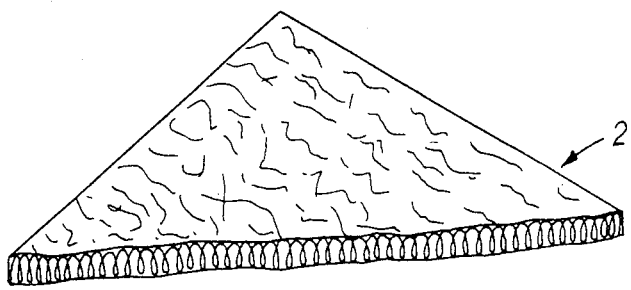
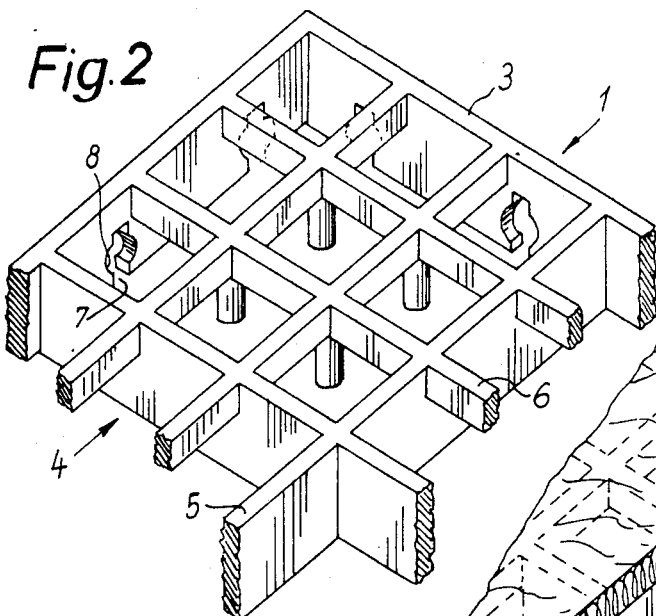
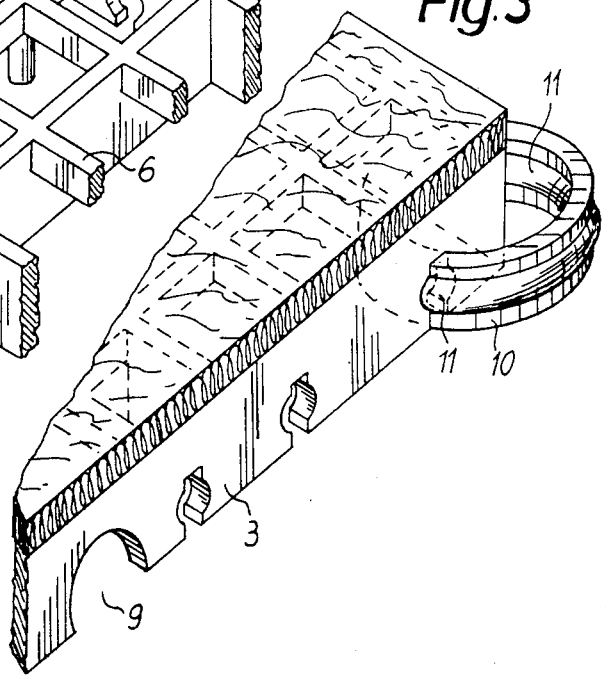
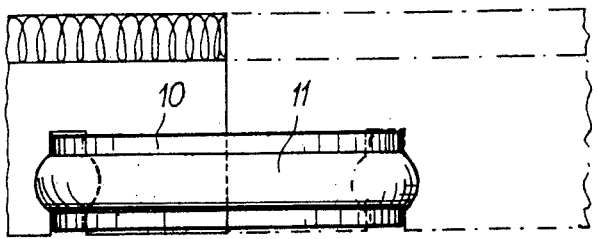

FLOOR COVERING ARTICLE

BACKGROUND OF THE INVENTION

1. Field of the Invention

The present invention relates to a platelike article intended as floor covering having at least one integral base element in form of a latticework surrounded by a rim and provided with slots located in said rim for installation of said platelike article, and having a textile covering material arranged at one side of said base element.

The invention relates also to a floor covering article including a plurality of integrally shaped base elements bonded at one side to a common textile material forming the walking surface thereof, each base element having the shape of a latticework enclosed by a lateral ring member and located at a distance from a respective adjacent base element thus defining a gap therebetween.

The invention relates further to a method of installing a floor covering including a platelike article having a plurality of integral base elements located at a distance from each other and forming a gap therebetween, which base elements are covered by a common textile-like covering material forming the walking surface.

2. Description of the Prior Art

Floor covering articles which are installed in enclosed rooms or in the open, for instance on patios, are generally known. The plates used consist either merely of a covering material which is placed directly onto the floor being covered or then of a base element and a covering element forming the walking surface proper, which elements are placed onto the ground. The covering material of these elements is bonded to the floor and the base elements thereof may be interconnected by coupling members.

The structure of these known floor coverings is however such, that it is impossible to install electrical cables under the covering material forming the walking surface. It is furthermore not possible to easily replace individual worn or damaged elements, partly due to the fact that they are bonded by means of a bonding agent to the floor.

A further drawback of known floor covering articles is the fact that their placing and installing is a time-consuming task.

SUMMARY OF THE INVENTION

Hence, it is a general object of the present invention to provide an improved construction of a floor covering article which is extremely simple in construction and design, economical to manufacture and dependable in use.

A further object is to provide a platelike article intended as floor covering having at least one integral base element in form of a latticework surrounded by a rim and provided with slots located in said rim for installation of said platelike article, and having a textile covering material arranged at one side of said base element, wherein a plurality of adjacent base elements is provided which are interconnected by said covering material such that at least one gap is present between adjacent base elements, further wherein said latticework consists of first latticed bars having a thickness equal to the height of said rim and of second latticed bars having a thickness which is smaller than said height of said rim, and wherein said slots are shaped as slits in said rim located at a mutual distance from each other and intended to receive a holding and arresting member.

Yet a further object of the present invention is to provide a floor covering article including a plurality of integrally shaped base elements bonded at one side to a common textile material forming the walking surface thereof, each base element having the shape of a latticework enclosed by a lateral ring member and located at a distance from a respective adjacent base element thus defining a gap therebetween, each said base element comprising a plurality of first said textile material supporting latticed bars and a further plurality of second said textile material supporting latticed bars, the height of said first latticed bars equalling the height of said rim member and the height of said second latticed bars being smaller than the height of said rim member also supporting said textile material, further wherein there is provided an interconnecting means interconnecting adjacent said base elements and said rim members comprising slots in which interconnecting members are lockingly received.

A further object of the invention is to provide a method of installing a floor covering including a platelike article having a plurality of integral base elements in form of a latticework surrounded by a rim and provided with slots located in said rim and having a textile covering material arranged at one side of each of said base elements, which base elements are located such that a gap is provided between adjacent base elements, the latticework consisting of first latticed bars having a thickness equal to the height of said rim and of second latticed bars having a thickness which is smaller than said height of said rim, which said slots are shaped as slits in said rim and located at a mutual distance from each other and are intended to receive a holding and an arresting member, comprising the steps of providing ⊥-shaped profiled guide members, of placing said guide members on the floor to be covered such that the flange section of the profile contacts the floor and its web section projects between respective adjacent base elements such to locate the base elements in the proper position.

Still a further object of the present invention is to provide a method of installing a floor covering article including a plurality of integrally shaped base elements bonded at one side to a common textile material forming the walking surface thereof, each base element having the shape of a latticework enclosed by a lateral rim member and located at a distance from a respective adjacent base element, thus defining a gap therebetween, each said base element having a plurality of first said textile material supporting latticed bars and a further plurality of second said textile material supporting latticed bars, the height of said first latticed bars equalling the height of said rim member and the height of said second latticed bars being smaller than the height of said rim member also supporting said textile material, including further an interconnecting means interconnecting adjacent said base elements and said rim members comprising slots in which said interconnecting members are lockingly received, comprising the steps of providing ⊥-shaped profiled guide members, of placing said guide members on the floor to be covered such that the flange section of the respective profiles rests on the floor, of placing said floor covering including said base elements such over said profiled guide members that their respective webs project into said gaps defined therebetween such to locate said base elements in their proper position.

BRIEF DESCRIPTION OF THE DRAWINGS

The present invention will be more fully understood by reference to the following detailed description thereof, when read in conjunction with the attached drawings, and wherein:

FIG. 2 is a perspective and exploded view of a section of the element shown in FIG. 1;

FIG. 3 is a perspective view of a corner portion of an element including an interconnecting member; and FIG. 4 is a side view of the element shown in FIG. 3 and illustrating the interconnection of adjacent elements.

DETAILED DESCRIPTION OF THE PREFERRED EMBODIMENT

Figure 1:
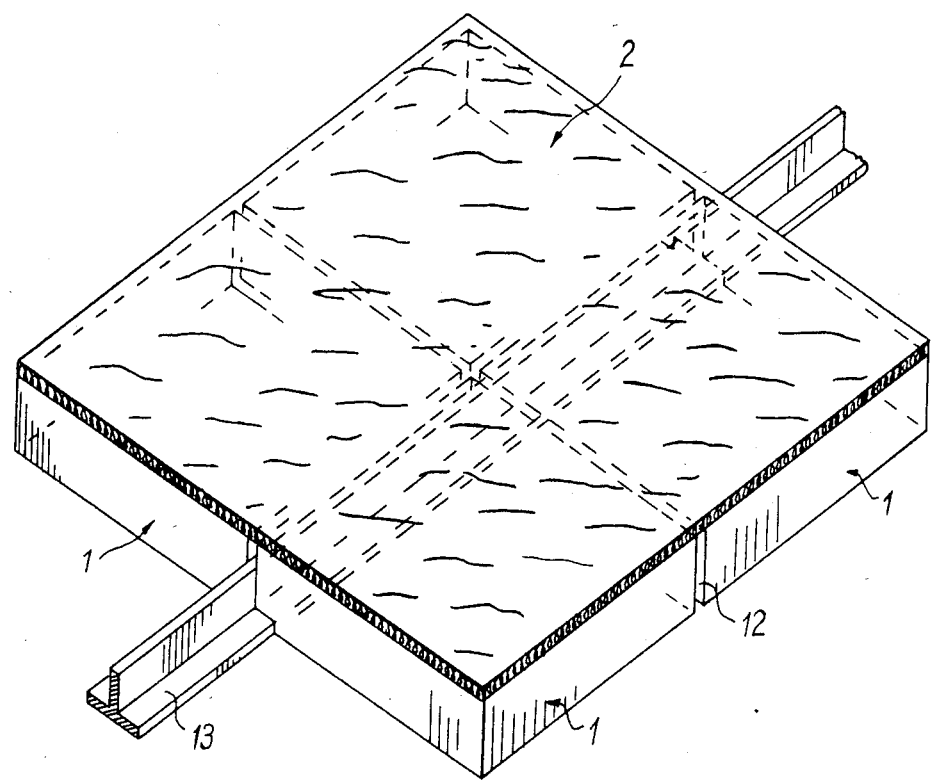
FIG. 1 is a perspective view of a preferred embodiment of the inventive article.

Describing now the drawings and considering initially the exemplary embodiment of the inventive floor covering article as shown in FIG. 1, it will be understood that a platelike element or article, respectively, comprises four base elements 1 and one textile covering material 2 which is bonded to one side of the base elements 1. In the plan view these base elements 1 have a square shape and are located such that a gap 12 is defined between two respective adjacent base elements 1.

Turning now to FIG. 2 it can be clearly seen that a single base element 1 is an integral structure in the shape of a latticework surrounded by a rim member 3. This rim member 3 is formed by upright sections having a rectangular cross-sectional shape. The latticework 4 is comprised of first latticed bars 5 having a thickness equalling the height of the rim member 3 and of two latticed bars 6 having a thickness which is smaller than the height of the rim member 3. The latticework 4 forms a square mesh structure. Its first latticed bars 5 form a supporting grid having a relatively large span and the second latticed bars 6 form a supporting grid having a relatively smaller span. The second latticed bars 6 are shaped relative to the rim member 3 such that one surface of the second latticed bars 6 define together with an edge surface of the rim 3 a common plane which is the supporting plane for the covering material 2. As shown in FIG. 2 posts extend downwardly from the intersections of the second latticed bars 6 to support the second latticed bars.

The latticework 4 of this embodiment is shown as having a square mesh shape. Further embodiments having an orthorhombic mesh shape are foreseen, too.

The rim 3 is provided with slots 7 located at several sections thereof and at equal distances from each other. These slots 7 are shaped with symmetrically designed recesses 8 having a round shape.

The base element 1 consists of a plastic material, for instance, polyethylene, polyvinylchloride, polystyrene, polypropylene or polyvinylacetate. It may also consist of the copolymerisates of mentioned materials.

The textile covering material 2 is a needled floor covering material, alternatively a tufted floor covering material or also a woven floor covering material.

In order to produce the platelike floor covering elements the covering material 2 is firstly placed into an injection mold and thereafter the base element 1 is injection molded thereupon.

The material for the base elements is injected into the mold with a temperature in the range of 180° C. to 220° C. and an injection pressure of $22 \times 10^6$ to $40 \times 10^6$ Pascal. Accordingly, an intensive bonding between the covering material 2 and those surface portions of the base element 1 contacting the covering material 2 will be achieved.

The injection molding material can be polyethylene, polyvinylchloride or polystyrene.

In order to prevent a melting off of the fibrous material forming the covering material 2 the injection mold form is cooled by water.

As shown in FIG. 3 further recesses 9 are shaped in the rim member 3, which further recesses 9 are of a semicircular shape and open against the edge of the rim 3 opposite to the covering material supporting edge.

When installing the platelike elements, they are placed contacting each other laterally such as shown in FIG. 4 such that the covering material 2 forming the walking surface is located at the upper side. In order to interconnect the individual platelike elements as shown, use is made of an annulus 10. According to FIGS. 3 and 4 this annulus 10 has a cross-sectional shape which corresponds to the cross-sectional shape of slot 7. The annulus 10 is provided with a bead 11 each located at its outer and its inner circumference, which beads 11 are received in the respective recesses 8 of the slots 7 such that the annulus 10 is lockingly held therein.

In place of the preferred embodiment, the annulus 10, it is possible to utilize other designs of locking and interconnecting elements, for instance, rectangularly or oval-shaped structures.

In order to assist a proper placing of the floor coverings ⊥-shaped guide members 13 are provided (FIG. 1). These guide members 13 will be initially placed onto the floor to be covered such that their web section penetrates into the gaps 12 existing between adjacent base elements 1 such to act as a guide. These guide members 13 may be manufactured from a metal or a plastic material and the height of their web section is at the most equal to the height of rim 3. These guide members 13 may be left in place or may be retrieved after having placed the floor covering.

While there are shown and described present preferred embodiments of the invention, it is to be distinctly understood that the invention is not limited thereto, but may be otherwise variously embodied and practiced within the scope of the following claims. ACCORDINGLY,

What is claimed is:

1. A platelike article intended as floor covering having an upper surface and a lower surface, and comprising a plurality of integral base elements each in the form of a latticework extending from the lower surface toward the upper surface and a rim laterally surrounding said latticework, and a textile covering material forming the upper surface and extending over and interconnecting said base elements, the rims of adjacent said base elements within said platelike article are spaced apart and form a gap traversing said platelike article, said latticework comprises first latticed bars extending from the lower surface to the side of said textile covering material closer to the lower surface, said rim having the same dimension between the lower surface and said textile covering material as said first latticed bars, and second latticed bars intersecting said first latticed bars and having a dimension extending from the side of said textile covering material closer toward the lower surface which is smaller than the comparable dimension of said first latticed bars and rim, and wherein said gaps are shaped as slits between said rims and are intended to receive guide members, said latticework and rims of said base elements are bonded by injection molding to said textile covering material, and said rims are provided with slots therethrough.

2. The platelike article of claim 1, in which each slot comprises symmetrically shaped lateral recesses.

3. The platelike article of claim 1, in which aligned recesses are provided in said rim and said first latticed bars and are shaped to provide a thoroughfare under said covering material.

4. The platelike article of claim 1, in which there are an even numbered amount of said base elements.

5. The platelike article of claim 1, in which there are an odd numbered amount of said base elements.

6. The platelike element of claim 1, in which said textile covering material is a needled floor covering material.

7. The platelike element of claim 1, in which said textile covering material is a tufted floor covering material.

8. The platelike element of claim 1, in which said textile covering material is a woven floor covering material.

9. The platelike element of claim 1, in which said base element consists of a material chosen from the group of polymerisates encompassing polyethylene, polyvinylchloride, polystyrene, polypropylene and polyvinylacetate and/or one of their copolymerisates.

10. The platelike element of claim 1, in which said latticework has a square or orthorhombic shape.

11. A floor covering article including a common textile material having an upper surface and a lower surface with the upper surface forming the wearing surface thereof, a plurality of integrally shaped injection molded base elements bonded to the lower surface of said common textile material so that said textile material interconnects said base elements, each base element having a latticework laterally enclosed by a rim member and located at a distance from a respective adjacent said base element of said floor covering article thus defining a gap therebetween, each of said base elements comprising a plurality of first textile material supporting latticed bars and a further plurality of second textile material supporting latticed bars, the height of said first latticed bars extending transversely of said common textile material equalling the corresponding height of said rim member and the height of said second latticed bars extending transversely of said common textile material being smaller than the height of said rim member and also supporting said textile material, and an interconnecting means interconnecting adjacent said base elements of adjacent floor covering articles and said rim members comprising slots in which said interconnecting members are lockingly received.

12. The floor covering article of claim 11, in which said textile material is a needled floor covering material.

13. The floor covering article of claim 11, in which said textile material is a tufted floor covering material.

14. The floor covering article of claim 11, in which said textile material is a woven floor covering material.

15. The floor covering article of claim 11, in which said latticework shaped base elements consists of a material chosen from the group of polymerisates encompassing polyethylene, polyvinylchloride, polystyrene, polypropylene, polyvinylacetate and one of their copolymerisates.

16. The floor covering article of claim 11, in which said latticework shaped base elements consist of a material chosen from the group of the copolymerisates of polyethylene, polyvinylchloride, polystyrene, polypropylene and polyvinylacetate.

17. The floor covering article of claim 11, in which every slot in said rim members comprises symmetrically oppositely located lateral recesses, and every said interconnecting member is an annulus having an outer circumferential side wall including a bead and an inner circumferential side wall including a further bead, the cross section of said annulus corresponding to the cross-sectional shape of said slots.

18. The floor covering article of claim 17, in which further recesses are provided in said rims and said first latticed bars at the respective edge areas thereof located oppositely from said textile material for providing thoroughfares arranged under said textile material.

* * * * *